(12) United States Patent
Freeman et al.

(10) Patent No.: US 10,136,121 B2
(45) Date of Patent: Nov. 20, 2018

(54) SYSTEM, METHOD AND SOFTWARE FOR PRODUCING VIRTUAL THREE DIMENSIONAL IMAGES THAT APPEAR TO PROJECT FORWARD OF OR ABOVE AN ELECTRONIC DISPLAY

(71) Applicant: Maxx Media Group, LLC, Philadelphia, PA (US)

(72) Inventors: Richard S. Freeman, Philadelphia, PA (US); Scott A. Hollinger, Philadelphia, PA (US)

(73) Assignee: Maxx Media Group, LLC, Philadelphia, PA (US)

( * ) Notice: Subject to any disclaimer, the term of this patent is extended or adjusted under 35 U.S.C. 154(b) by 0 days.

(21) Appl. No.: 15/481,447

(22) Filed: Apr. 6, 2017

(65) Prior Publication Data
US 2017/0294052 A1    Oct. 12, 2017

Related U.S. Application Data

(60) Provisional application No. 62/319,788, filed on Apr. 8, 2016.

(51) Int. Cl.
*H04N 13/239* (2018.01)
*H04N 13/15* (2018.01)

(52) U.S. Cl.
CPC ........... *H04N 13/239* (2018.05); *H04N 13/15* (2018.05)

(58) Field of Classification Search
CPC .. G06F 3/011; G06F 3/04815; G06F 3/04842; G06T 19/006; G06T 15/20; G06T 17/00; G06T 2215/16; G06T 19/20; G06T 2219/2021; G06T 7/70; A63F 13/525; A63F 13/5258; A63F 2300/66; A63F 2300/5553; G03H 2210/454; G06K 9/00208; H04N 13/0275; H04N 2013/0081; H04N 13/0022; H04N 13/004; H04N 13/0278; H04N 13/0468
See application file for complete search history.

(56) References Cited

U.S. PATENT DOCUMENTS

| | | |
|---|---|---|
| 3,723,904 A | 3/1973 | Bernier |
| 5,790,284 A | 8/1998 | Taniguchi et al. |
| 6,121,972 A | 9/2000 | Takahashi et al. |
| 6,614,427 B1 | 9/2003 | Aubrey |
| 6,657,998 B2 | 12/2003 | Li |
| 7,364,300 B2 | 4/2008 | Favalora et al. |
| 7,589,759 B1 | 9/2009 | Freeman et al. |

(Continued)

*Primary Examiner* — Haixia Du
(74) *Attorney, Agent, or Firm* — LaMorte & Associates, P.C.

(57) ABSTRACT

A system, method and software for producing a virtual scene to be viewed on an electronic display. A virtual reference plane is defined. The reference plane has peripheral boundaries. A virtual object is positioned above the reference plane in the virtual scene. Stereoscopic camera viewpoints are calculated that enable the virtual object to be imaged with the reference plane within the peripheral boundaries of the reference plane. The virtual object is digitally altered before and/or after being stereoscopically imaged. The altering includes bending, tapering or tilting a portion of the virtual object, and/or tilting a portion of the reference plane. A common set of boundaries are set for a superimposed image to create a final image.

17 Claims, 11 Drawing Sheets

(56) References Cited

U.S. PATENT DOCUMENTS

| | | | |
|---|---|---|---|
| 2008/0079660 A1* | 4/2008 | Fukushima | .......... H04N 13/026 345/7 |
| 2011/0063420 A1 | 3/2011 | Masuda | |
| 2012/0263372 A1 | 10/2012 | Adachi | |
| 2012/0314934 A1* | 12/2012 | Kudo | .................. G06F 3/04845 382/154 |

\* cited by examiner

SYSTEM, METHOD AND SOFTWARE FOR PRODUCING VIRTUAL THREE DIMENSIONAL IMAGES THAT APPEAR TO PROJECT FORWARD OF OR ABOVE AN ELECTRONIC DISPLAY

RELATED APPLICATIONS

This application claims the benefit of provisional patent application No. 62/319,788, filed Apr. 8, 2016.

BACKGROUND OF THE INVENTION

1. Field of the Invention

In general, the present invention relates to systems, methods, and software that are used to create virtual stereoscopic and/or auto-stereoscopic images that are viewed on an electronic display. More particularly, the present invention relates to systems, methods and software that create virtual images that appear to project vertically above or in front of the electronic display. In this manner, the virtual image can appear to stand atop or float above the electronic display and/or float in front of the electronic display.

2. Prior Art Description

Many systems exist for creating stereoscopic and auto-stereoscopic images. These images are two-dimensional but appear three-dimensional when viewed on a standard display using 3D-glasses or when viewed on an auto-stereoscopic display without 3D glasses. However, although the images created by the prior art systems are three-dimensional images, they typically appear to exist behind or below the plane of the electronic screen. Accordingly, the electronic display has the effect of being a window behind which a three dimensional scene can be viewed.

If is far more difficult to create a virtual image that will appear to stand above, or in front of, the screen on which it is viewed. To create a virtual image that appears to be above or in front of a display, sophisticated adjustments have to be incorporated into the creation of the image. Such adjustments often include complex adjustments to the parallax and angle of view designed into the virtual image. A prior art systems that modifies the parallax and angle of view of a stereoscopic image is exemplified by U.S. Pat. No. 7,589,759 to Freeman.

In U.S. Pat. No. 7,589,759 to Freeman, a system is disclosed that creates a virtual 3D object that appears to be in front of or above a display screen. This is primarily accomplished by creatively altering the parallax and angle of view of the imaging stereoscopic cameras as the object is imaged.

It has been discovered that virtual images of 3D objects can be created more realistically and with more clarity by altering the image of the object being imaged in new ways. In the present invention the Applicants have developed a system and method that incorporate several improvements on the prior art, and create better stereoscopic/auto-stereoscopic images that produce the appearance of an object in a forward projection or vertical projection, wherein the dimensional effects are dramatically improved. The images are high quality and present an advancement in the art. The improved system and method are described and claimed below.

SUMMARY OF THE INVENTION

The present invention is a system, method and software for producing a virtual 3D scene that appears to project vertically from, or forward of, an electronic display. The virtual scene can be a fixed image or a dynamic video. The virtual scene contains a virtual object that appears to be three dimensional when viewed on the electronic display.

To create the virtual scene, a virtual zero parallax reference plane is defined. The reference plane has peripheral boundaries that include a front boundary, a rear boundary, and side boundaries. At least one virtual object is added to the virtual scene. The virtual object is viewed within the boundaries of the reference plane from a view point above the reference plan. In order to improve the appearance of the virtual object above or in front of the electronic display, the virtual object and/or elements of the virtual scene are digitally altered.

Stereoscopic camera viewpoints are calculated that enable the virtual object to be imaged within the peripheral boundaries of the reference plane. The virtual object is digitally altered prior to, and/or after being imaged. The altering of the virtual object includes bending a portion of the virtual object, tapering a portion of the virtual object, tilting the virtual object and/or tilting all or a portion of the reference plane.

The virtual scene is imaged from stereoscopic viewpoints. The imaging creates a first image and a second image. The two images of the altered virtual object are superimposed to create a superimposed image. A common set of boundaries are set for the superimposed image to create a final image. The final image can be shown on an electronic display, wherein the reference plane used in the virtual scene is aligned with the plane of the screen of the electronic display. The result is that the virtual object in the virtual scene will appear to be above, or in front of, the electronic display depending upon the orientation of the display.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system, method and software can be embodied in many ways, the embodiment illustrated shows the system, method and software being used to simulate an image of a dinosaur. This embodiment is selected for the purposes of description and explanation. The dinosaur is intended to represent any object, real or imaginary, that can be imaged and presented through the system. However, the illustrated embodiment is purely exemplary and should not be considered a limitation when interpreting the scope of the appended claims.

Figure 1:
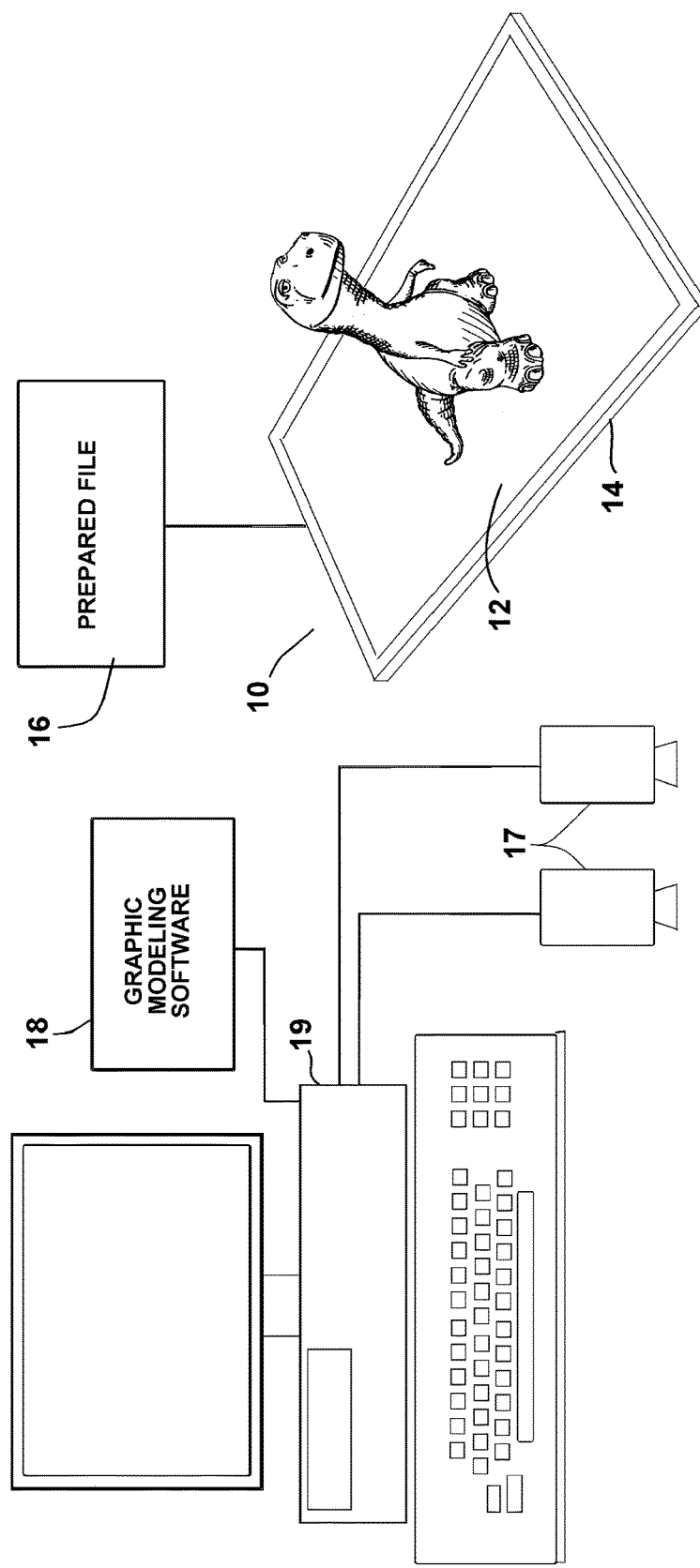
FIG. 1 shows system hardware needed to create and utilize the present invention system, method, and software.

Referring to FIG. 1, it will be understood that the present invention is used to produce a virtual scene 10 on a display 12 of an electronic device 14. The virtual scene 10 appears to a person viewing the virtual scene 10 to have features that are three-dimensional. Furthermore, the virtual scene 10 has elements that appear to the viewer to extend above the plane of the display 12. If the electronic device 14 has a traditional LED or LCD display, the virtual scene 10 will have to be viewed with 3D glasses in order to observe the three-dimensional effects in the virtual scene 10. If the electronic device 14 has an auto-stereoscopic display, then the three-dimensional effects in the virtual scene 10 can be observed without the need of specialized glasses.

The virtual scene 10 displayed on the electronic device 14 can be a static image or a video. Furthermore, the virtual scene 10 can be part of a video game or a movie. Regardless of the context in which the virtual scene 10 is presented, the user must download or otherwise input the image, mobile application, game, movie or other such prepared software file 16 into the electronic device 14 that contains the virtual scene 10.

The prepared software file 16 is created by a graphic artist, game designer or similar content producer. The content producer creates the virtual scene 10 in the prepared software file 16 using graphic modeling software 18 run on the computer system 19 of the content producer. As will be described, the graphic modeling software 18 requires the use of two stereoscopic images. If the virtual scene 10 contains virtual objects, the virtual objects are imaged with virtual cameras. If the virtual scene 10 contains real objects, the real objects can be imaged with a stereoscopic set of real cameras 17.

Figure 2:
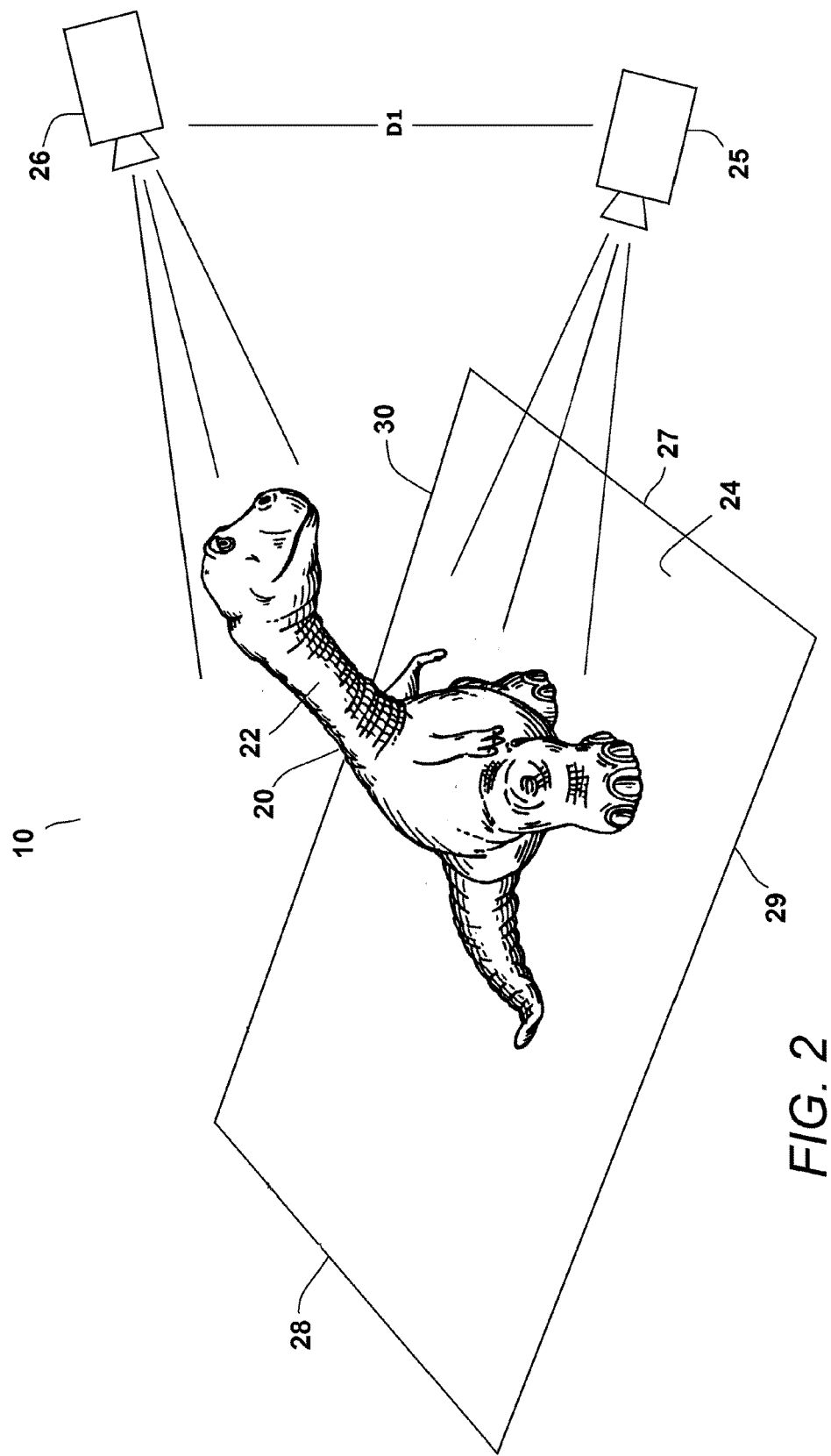
FIG. 2 is a perspective view of an exemplary embodiment of a virtual scene.
Figure 3:
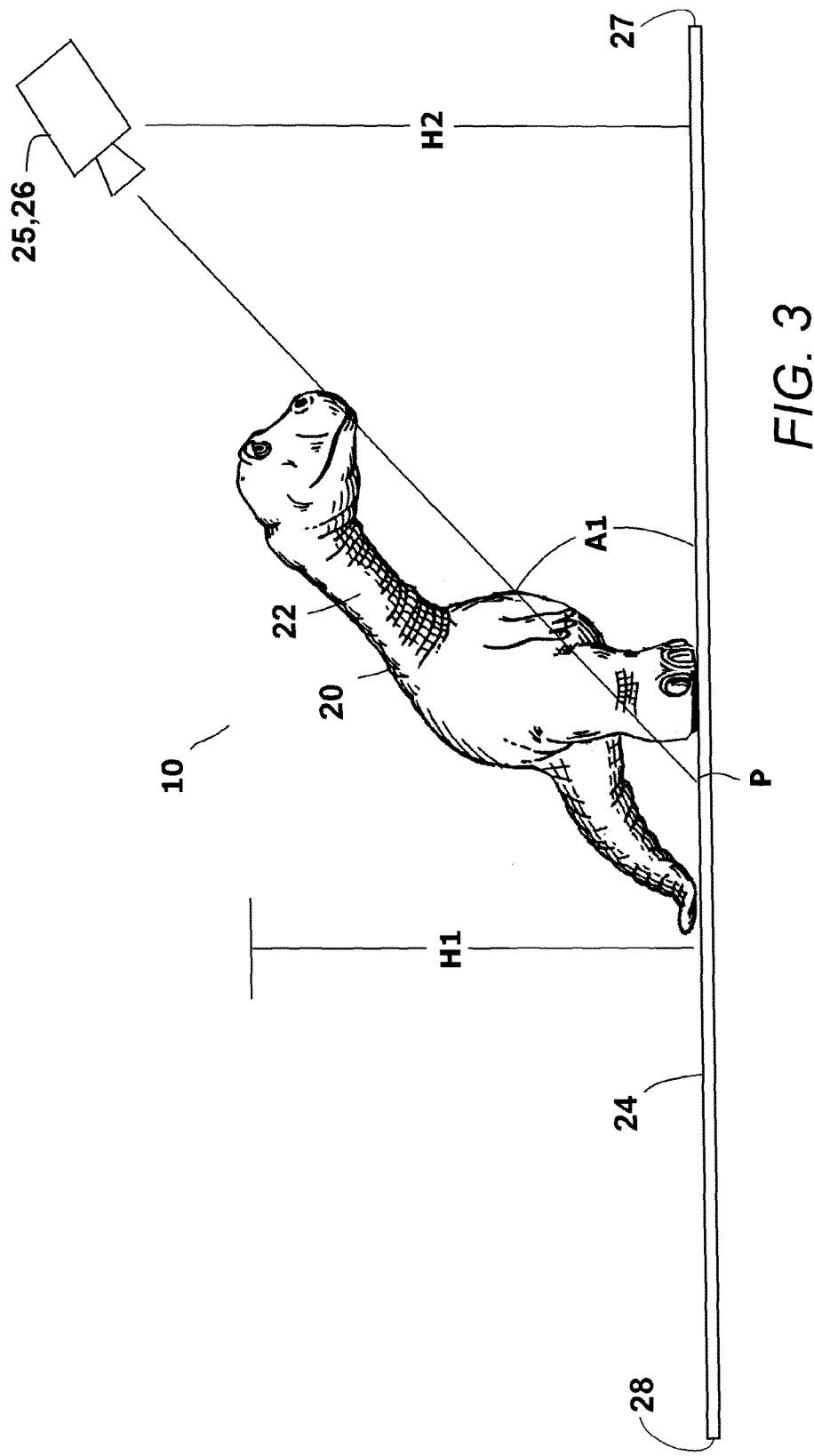
FIG. 3 is a side view of the virtual scene of FIG. 2.

Referring to FIG. 2 and FIG. 3 in conjunction with FIG. 1, an exemplary virtual scene 10 is shown that was created using the graphic modeling software 18. The virtual scene 10 contains a primary object 20. In the shown example, the primary object 20 is a dinosaur 22. However, it will be understood that any object can be modeled in the virtual scene 10. The virtual scene 10 has a reference plane 24. The reference plane 24 can be any plane in the virtual scene 10 from which objects are to appear above, in front of, and/or below. In the shown embodiment, the reference plane 24 is oriented with the ground upon which the dinosaur 22 stands. The reference plane 24 of the virtual scene 10, when displayed on an electronic display 12, is going to be oriented along the plane of the electronic display 12. As such, when the virtual scene 10 is viewed, any object imaged above the reference plane 24 will project forward and appear to extend out in front of the display 12 or above the display 12, depending on the orientation of the display 12. Conversely, any object imaged below the reference plane 24 will appear to be rearwardly projected and will appear below or behind the virtual zero parallax reference plane, when the virtual scene 10 is viewed.

If the virtual scene 10 is to be printed, then the reference plane 24 is selected by the content producer. The reference plane is typically selected to correspond with the plane of the paper upon which the virtual scene 10 is printed. However, other reference planes can be selected.

Although a real object can be imaged with real cameras 17 to produce digital stereoscopic and/or auto-stereoscopic images, this technique is not used as the example. In the example provided, the object to be imaged is a virtual object that is generated by the graphic modeling software 18 that is run on the computer system 19 of the content producer. As such, by way of example, it will be assumed that the primary object 20 being created is a virtual object set in the virtual scene 10 and imaged with virtual cameras. However, it will be understood that the same techniques to be described herein can be used to create stereoscopic and/or auto-stereoscopic images of a real object by imaging a real object with real cameras 17.

Stereoscopic views are taken of the virtual scene 10. The stereoscopic views are taken from a virtual left camera viewpoint 25 and a virtual right camera viewpoint 26. The distance D1 between the virtual camera viewpoints 25, 26 and the angle of elevation A1 of the virtual camera viewpoints 25, 26 are dependent upon the scope of the virtual scene 10. The virtual scene 10 is being created to be shown on an electronic display 12. Most electronic displays are rectangular in shape, having a width that is between 50% and 80% of the length. Accordingly, the virtual scene 10 is created within boundaries that make the virtual scene 10 appropriate in size and scale for a typical electronic display 12. The boundaries include a front boundary 27, a rear boundary 28, and two side boundaries 29, 30. Any virtual scene 10 that is to be displayed on the electronic display 12 must exist within the boundaries 27, 28, 29, 30 in order to be seen.

A rear image boundary 28 is set for the virtual scene 10. All of the objects to be imaged in the virtual scene 10 are to appear forward of the rear image boundary 28. The primary object 20 has a height H1. The virtual camera viewpoints 25, 26 are set to a second height H2. The second height H2 is a function of the object height H1 and the rear image boundary 28. The second height H2 of the virtual camera viewpoints 25, 26 is high enough so that the top of the primary object 20, as viewed from the virtual camera viewpoints 25, 26, does not extend above the rear image boundary 28. The elevation angle of the virtual camera viewpoints 25, 26 and the convergence angle of the camera viewpoints 25, 26 have a direct mathematical relationships that depend upon the scene boundaries 27, 28, 29, 30 and height H1 of the primary object 20.

The virtual camera viewpoints 25, 26 have parallax angles so that the virtual camera viewpoints 25, 26 intersect at the reference plane 24. That is, the two virtual camera viewpoints 25, 26 achieve zero parallax at the reference plane 24. The convergence point P is preferably selected to correspond to a point near the bottom and rear of the primary object 20, should the primary object 20 be resting on the reference plane 24. For example, in the shown embodiment, the reference plane 24 corresponds to the ground upon which the dinosaur 22 stands. The virtual camera viewpoints 25, 26 are directed to the ground just below the rear of the dinosaur's body. However, if the virtual scene were that of an airplane flying through clouds, then the reference plane could be well below the position of the airplane. In this scenario, the virtual camera viewpoints 25, 26 would be directed to the reference plane 24 below where the virtual airplane appears to fly. The angles of the virtual camera viewpoints 25, 26 are adjusted on a frame-by-frame basis as the primary object 20 moves relative to the reference plane 24.

Figure 4:
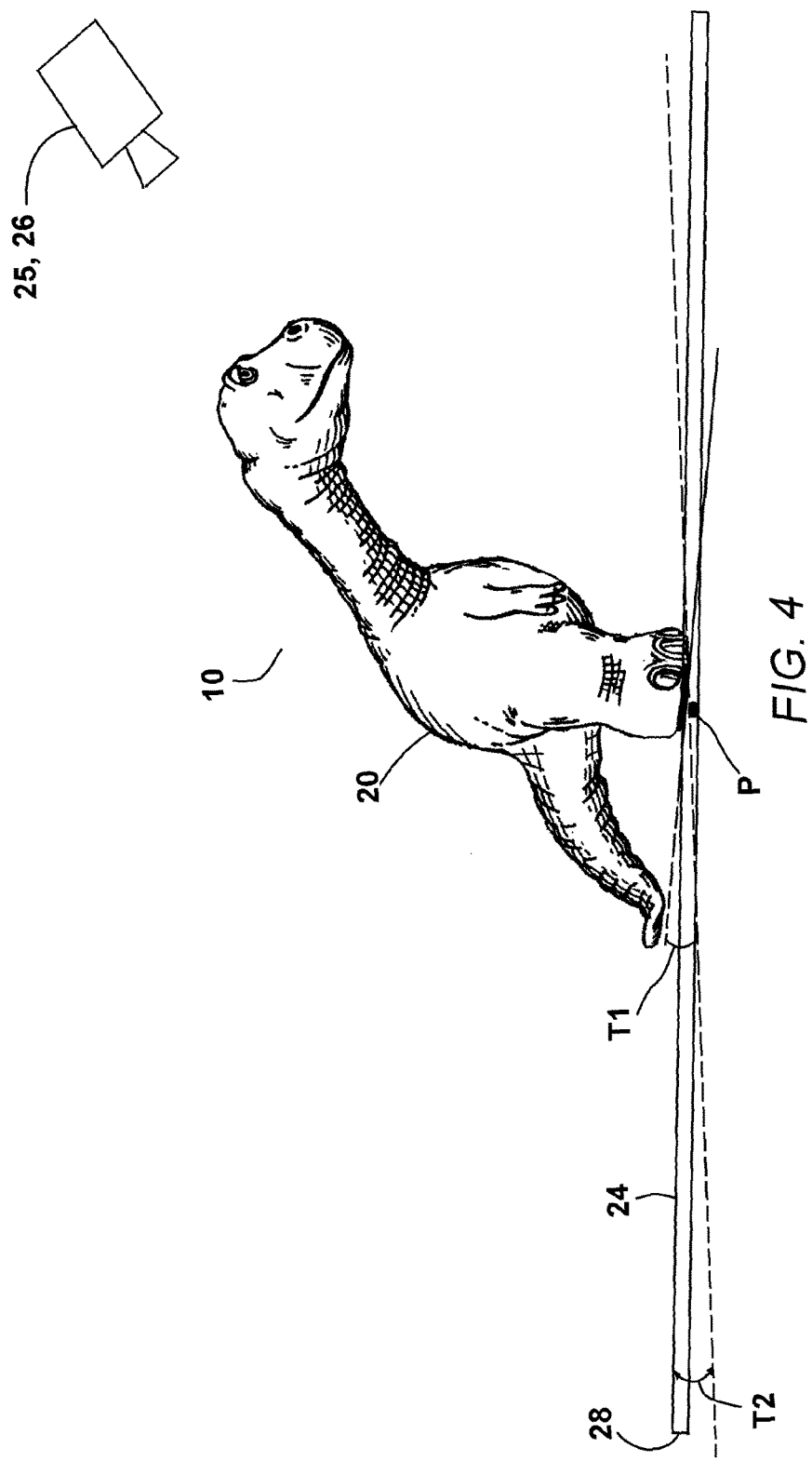
FIG. 4 is a side view showing tilt digital modifications made to the reference plane and/or a virtual object in the virtual scene.

Referring to FIG. 4 in conjunction with FIG. 3, it can be explained that the virtual scene 10 is not merely imaged from the camera viewpoints 25, 26. Rather, before and/or after the imaging of the virtual scene 10, the virtual scene 10 is digitally manipulated in various manners that are beneficial to the stereoscopic images that will be obtained. The digital manipulations include, but are not limited to:

i. tilt manipulations of the reference plane of the virtual scene;
 ii. tilt manipulations of the primary and secondary objects in the virtual scene;
 iii. bend manipulations of objects in the virtual scene; and
 iv. taper manipulations of objects in the virtual scene.

The manipulations that are used depend upon the details of the objects to be imaged in the virtual scene 10.

FIG. 4 illustrates two of the possible tilt manipulations that can be used. In a first tilt manipulation, the reference plane 24 can be tilted toward or away from the virtual camera viewpoints 25, 26. The preferred tilt angle A2 is generally between 1 degree and 20 degrees from the horizontal, depending upon the final perceived height of the primary object 20. In a second tilt manipulation, the object 20 can be tilted toward or away from the virtual camera viewpoints 25, 26. The preferred tilt angle A1 is generally between 1 degree and 20 degrees from the horizontal, depending upon the final perceived height of the primary object 20. The tilt angle A1 of the primary object 20 is independent the tilt angle A2 of the reference plane and other elements in the virtual scene 10.

Using the camera viewpoint conversion point P under the primary object 20 as a fulcrum point, the reference plane 24 can be digitally manipulated to tilt forward or backward. The tilt angle T2 of the reference plane 24 is independent of the tilt angle T1 of the primary object 20. The tilting of the reference plane 24 changes the position of the rear image boundary 28 relative to the perceived position of the primary object 20. This enables the height of the primary object 20 to be increased proportionately within the confines of the mathematical relationship.

Figure 5:
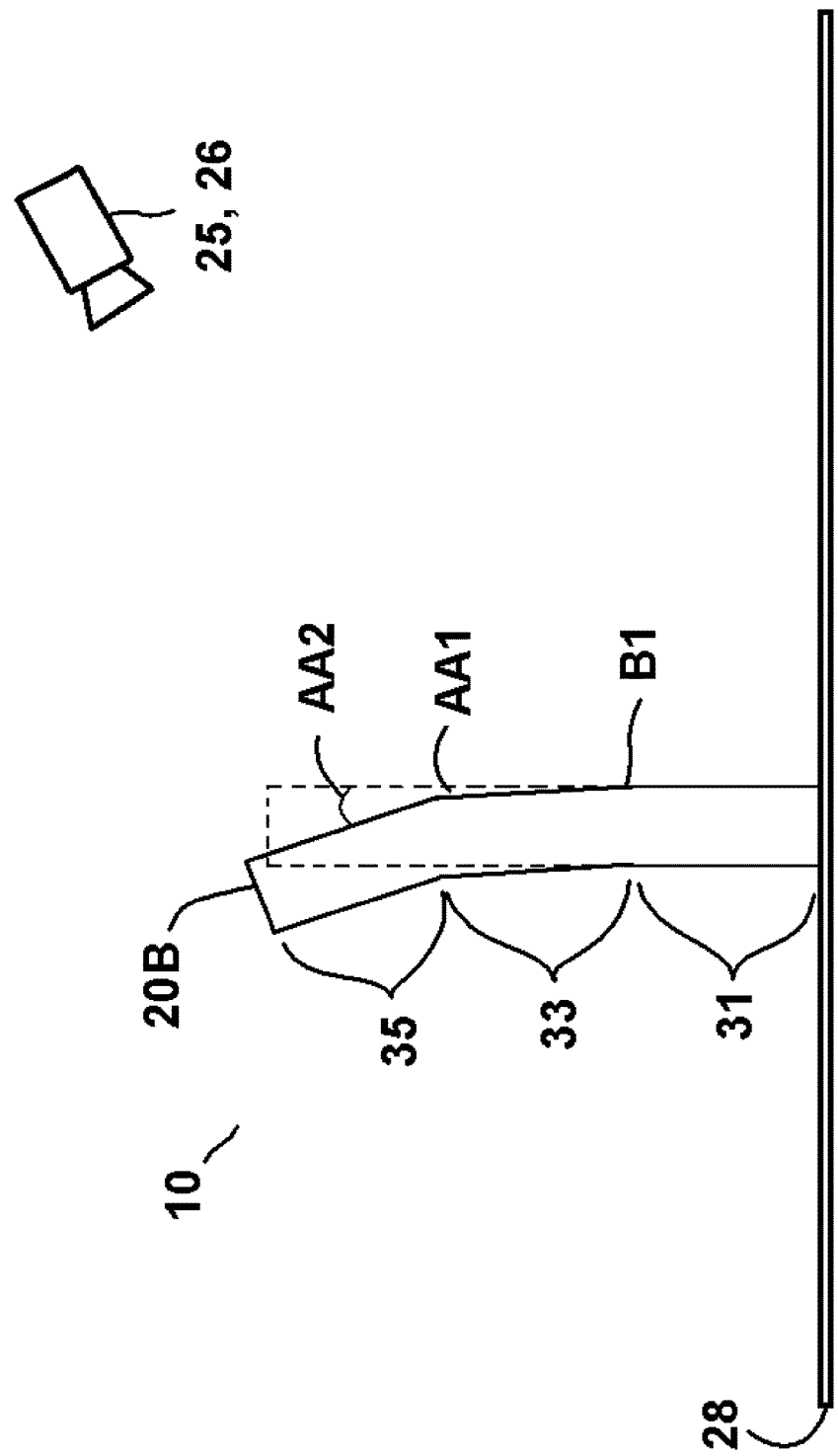
FIG. 5 is a side view showing bend digital modifications made to the virtual object in the virtual scene.

Referring to FIG. 5, a preferred bend manipulation is shown. In FIG. 5, the primary object 20B is shown as a rectangle, rather than a dinosaur, for ease of explanation. A bend in the complex shape of a dinosaur would be difficult to perceive. A bend point B1 is selected along the height of the primary object 20B. The bend point B1 is between ⅓ and ⅔ the overall height of the primary object 20B. The primary object 20B is also divided into three regions 31, 33, 35 along its height. In the first region 31, the primary image 20B is not manipulated. In the second region 33, no manipulation occurs until the bend line B1. Any portion of the primary object 20B above the bend line B1 and within the second region 33 is digitally tilted by a first angle AA1. In the third region 35, the primary object 20B is tilted at a second angle AA2, which is steeper than the first angle AA1. The first angle AA1 and the second angle AA2 are measured in relation to an imaginary vertical plane that is parallel to the vertical plane in which the virtual camera viewpoints 25, 26 are set. The result is that the virtual scene 10 can be made larger and taller without extending above the rear image boundary 28. When viewed from the virtual camera viewpoints 25, 26, the primary object 20B appears taller and has a more pronounced forward or vertical projection.

Figure 6:
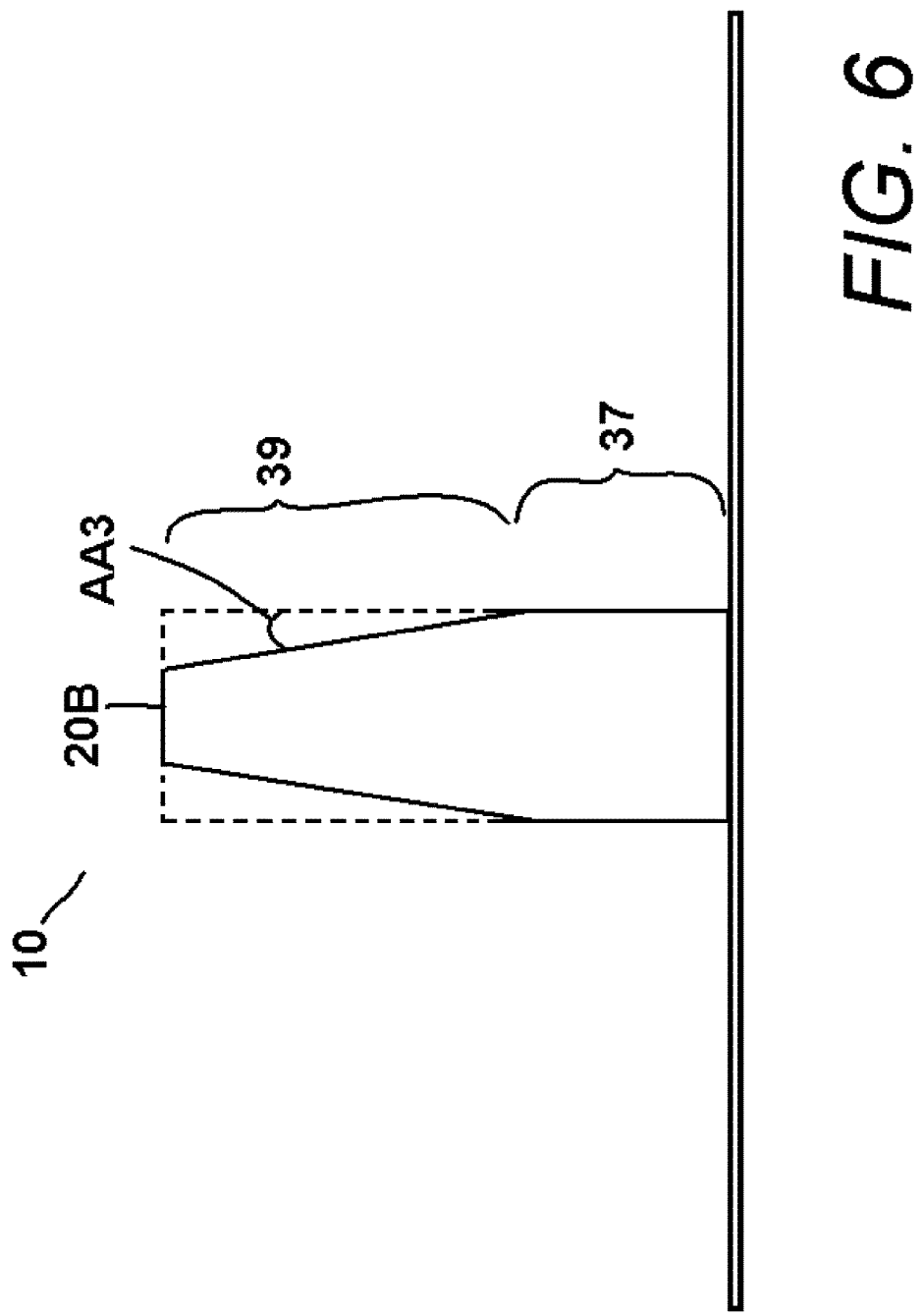
FIG. 6 is a front view showing taper digital modifications made to the virtual object in the virtual scene.

Referring to FIG. 6, a preferred taper manipulation is explained. Again, the primary object 20B is shown as a representative rectangle, rather than a dinosaur for ease of explanation. The primary object 20B is divided into two regions 37, 39 along its height. In the first region 37, the primary object 20B is not manipulated. In the second region 39, the primary object 20B is reduced in size using a taper from front to back of an angle AA3 of between 1 degree and 25 degrees. The point where the taper begins is positioned between ⅓ and ⅔ up the height of the primary object 20B. The result is that the virtual scene 10 can be made wider without extending beyond the side image boundaries 29, 30. When viewed, the primary object 20B appears taller and has a more pronounced forward or vertical projection.

Once the virtual scene 10 is digitally adjusted in one or more of the manners described, an altered virtual scene is created. Alternatively, the virtual scene can be imaged prior to any digital adjustments and the digital adjustments can be performed after the two images are combined into a stereoscopic or auto-stereoscopic image.

Figure 7:
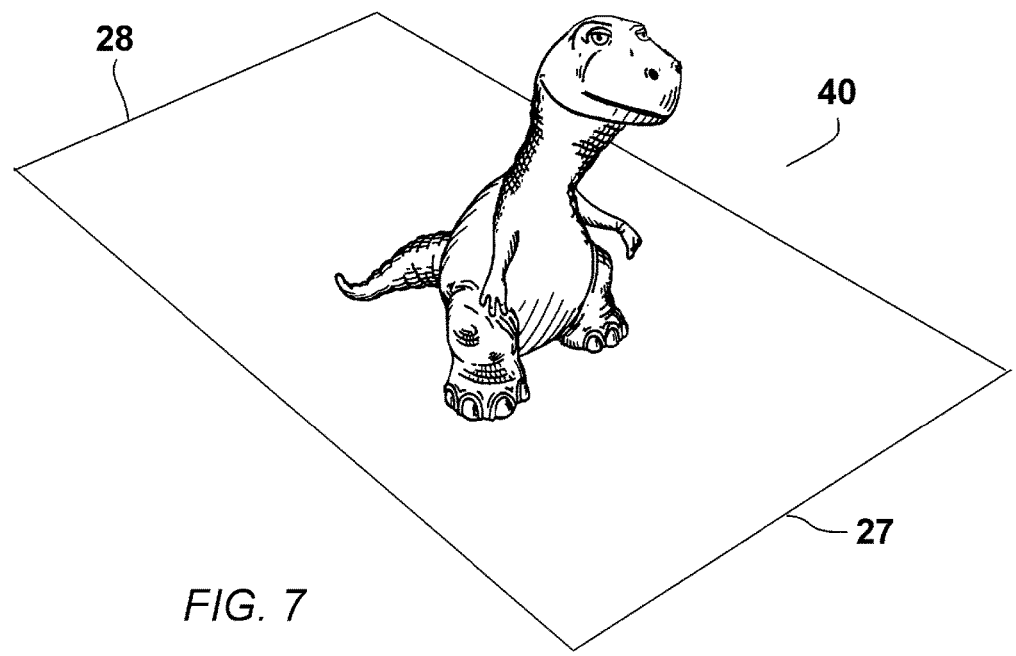
FIG. 7 and FIG. 8 show left and right stereoscopic images, respectively, of the virtual scene.
Figure 8:
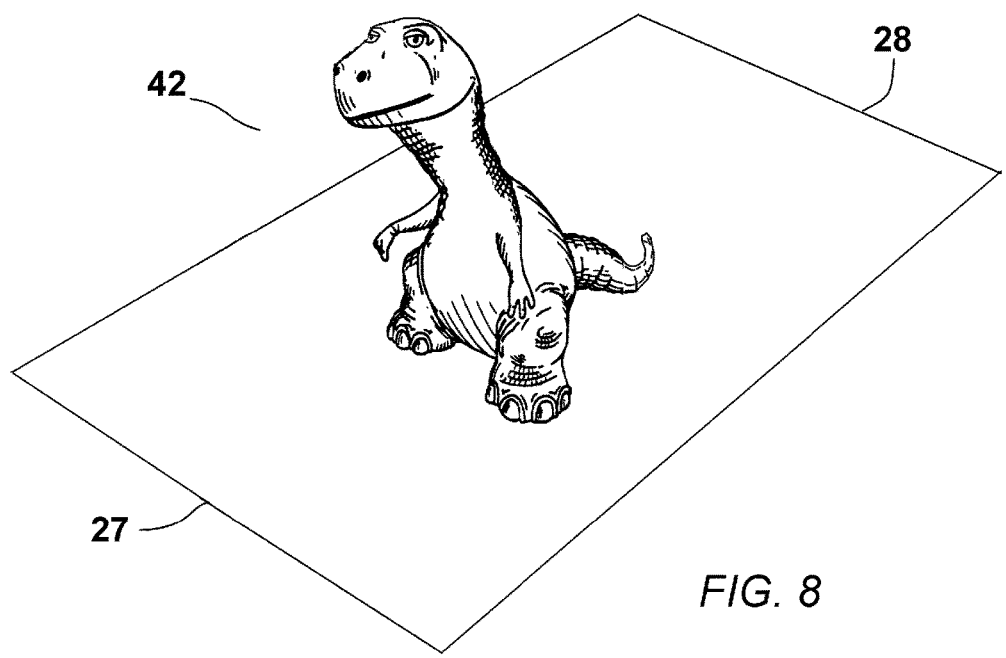

Referring to FIG. 7 and FIG. 8 in conjunction with FIG. 2, it can be seen that the two images 40, 42 are stereoscopic, with one being the left camera image (FIG. 7) and one being the right camera image 42 (FIG. 8). Each stereoscopic image 40, 42 has a fading perspective due to the angle of the camera viewpoints. This causes the front image boundary 27 to appear to be wider than the rear image boundary 28.

Figure 9:
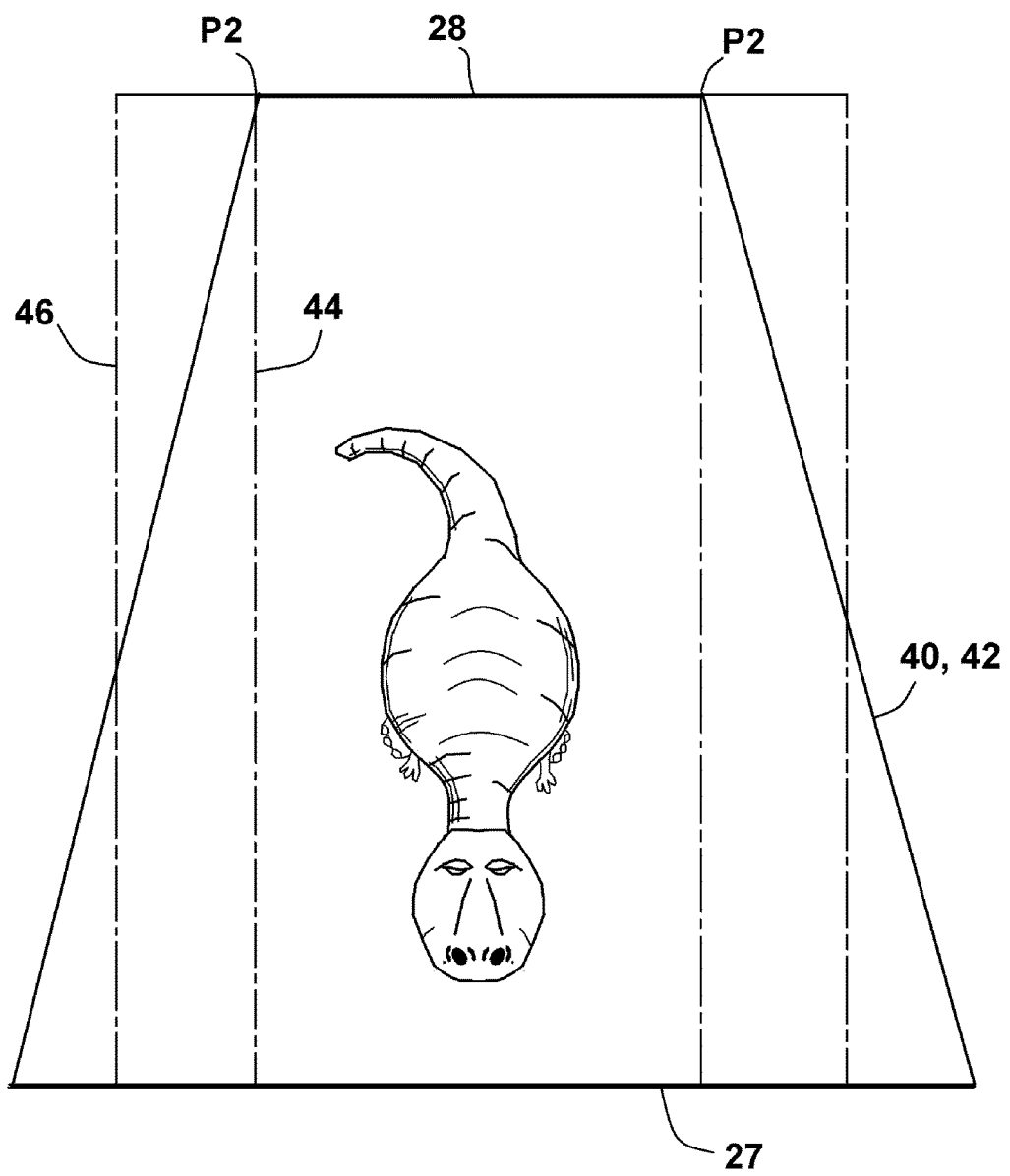
FIG. 9 is a top view of the stereoscopic images showing the superimposition of guidelines.

Referring to FIG. 9, a top view of one of the stereoscopic images 40, 42 from FIG. 7 or FIG. 8 is shown. Although only one of the stereoscopic images is shown, it will be understood that the described process is performed on both of the stereoscopic images. Thus, the reference numbers 40, 42 of both stereoscopic images are used to indicate that the processes affect both.

Temporary reference guides are superimposed upon the stereoscopic images 40. 42. The reference guides include a set of inner guidelines 44 and a set of outer guidelines 46. The inner guidelines 44 are parallel lines that extend from the rear image boundary 28 to the front image boundary 27. The inner guidelines 44 begin at points P2 where in stereoscopic images 40, 42 met the rear boundary line 28. The outer guidelines 46 are also parallel lines that extend from the rear image boundary 28 to the front image boundary 27. The position of the outer guidelines 46 depends upon the dimensions of the electronic display 12 upon which the virtual scene 10 is to be displayed. The width between the outer guidelines 46 corresponds to the pixel width of the electronic display to be used.

Figure 10:
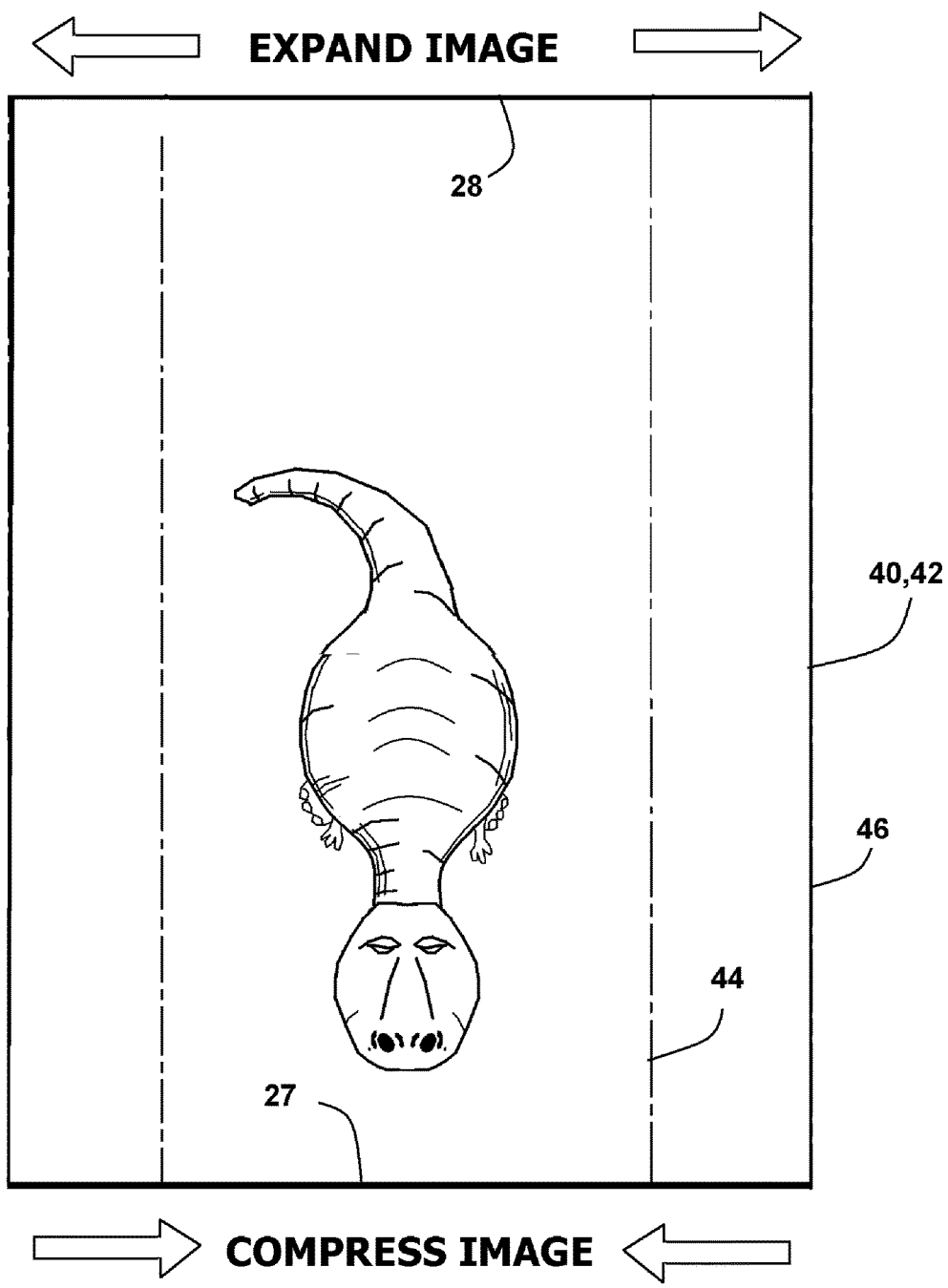
FIG. 10 shows a digitally corrected stereoscopic image created using the guidelines previously shown in FIG. 9.

Referring to FIG. 10 in conjunction with FIG. 9, it can be seen that the stereoscopic images 40, 42 are digitally altered to fit within the parameters of the outer guidelines 46. As such, the stereoscopic images 40, 42 are widened toward the rear image boundary 28 and compressed toward the front image boundary 27. This creates corrected stereoscopic images 40A, 42A. The inner guidelines 44 remain on the corrected stereoscopic images 40A, 42A.

Figure 11:
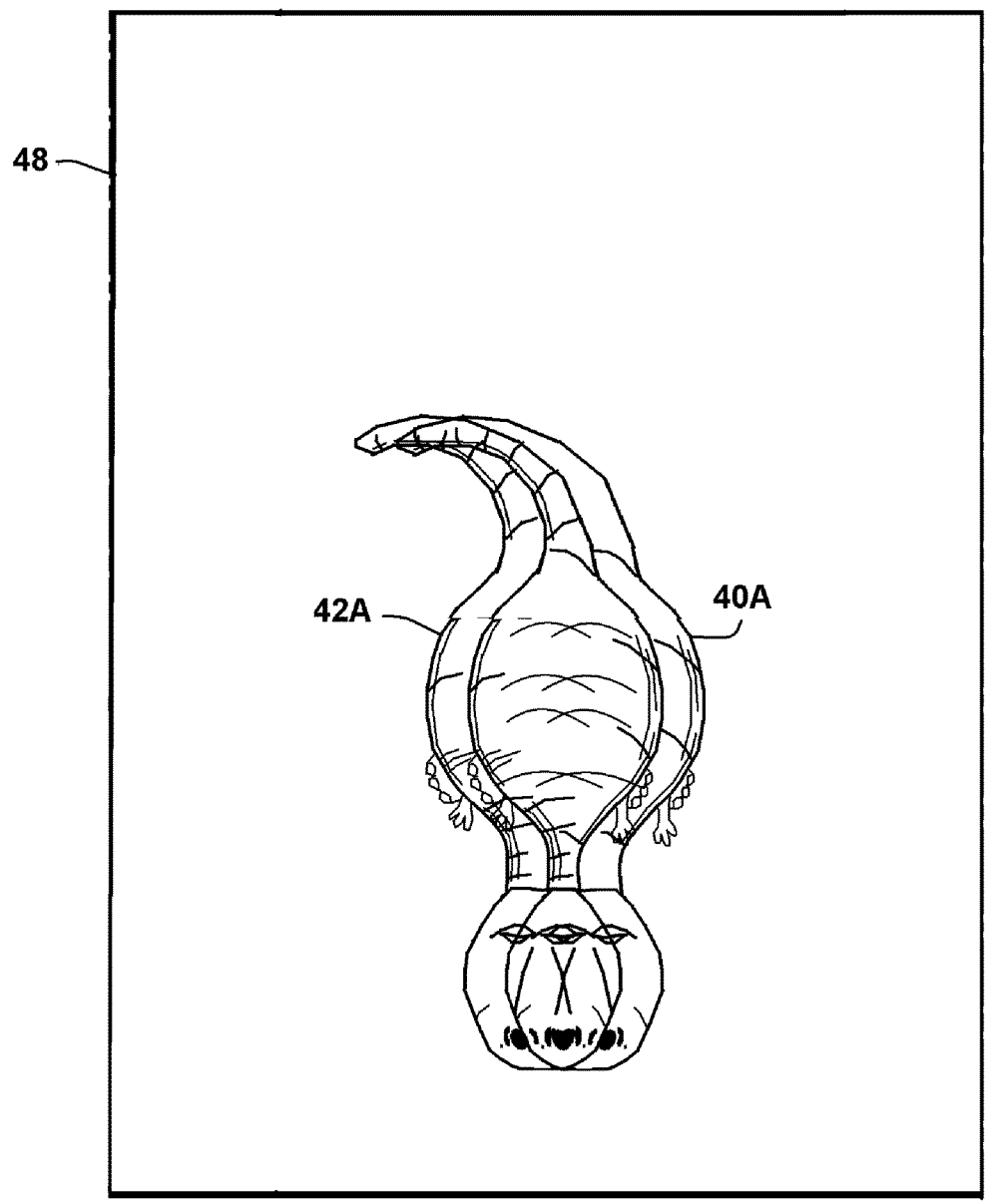
FIG. 11 shows a final image with left and right stereoscopic images superimposed.

Referring to FIG. 11, in conjunction with FIG. 10, the corrected left and right stereoscopic images 40A, 42A are superimposed. The inner guidelines 44 from both corrected stereoscopic images 40A, 42A are aligned. Once alignment is achieved, the inner guidelines 44 are removed. This creates a final image 48. Depending upon how the final image 48 is to be viewed, the corrected stereoscopic images 40A, 42A can be colored in red or blue, or the corrected images 40A, 42A can be oppositely polarized. In this manner, when the final image 48 is viewed using 3D glasses or on an anto-stereoscopc display, the final image 48 will appear to be three-dimensional.

Figure 12:
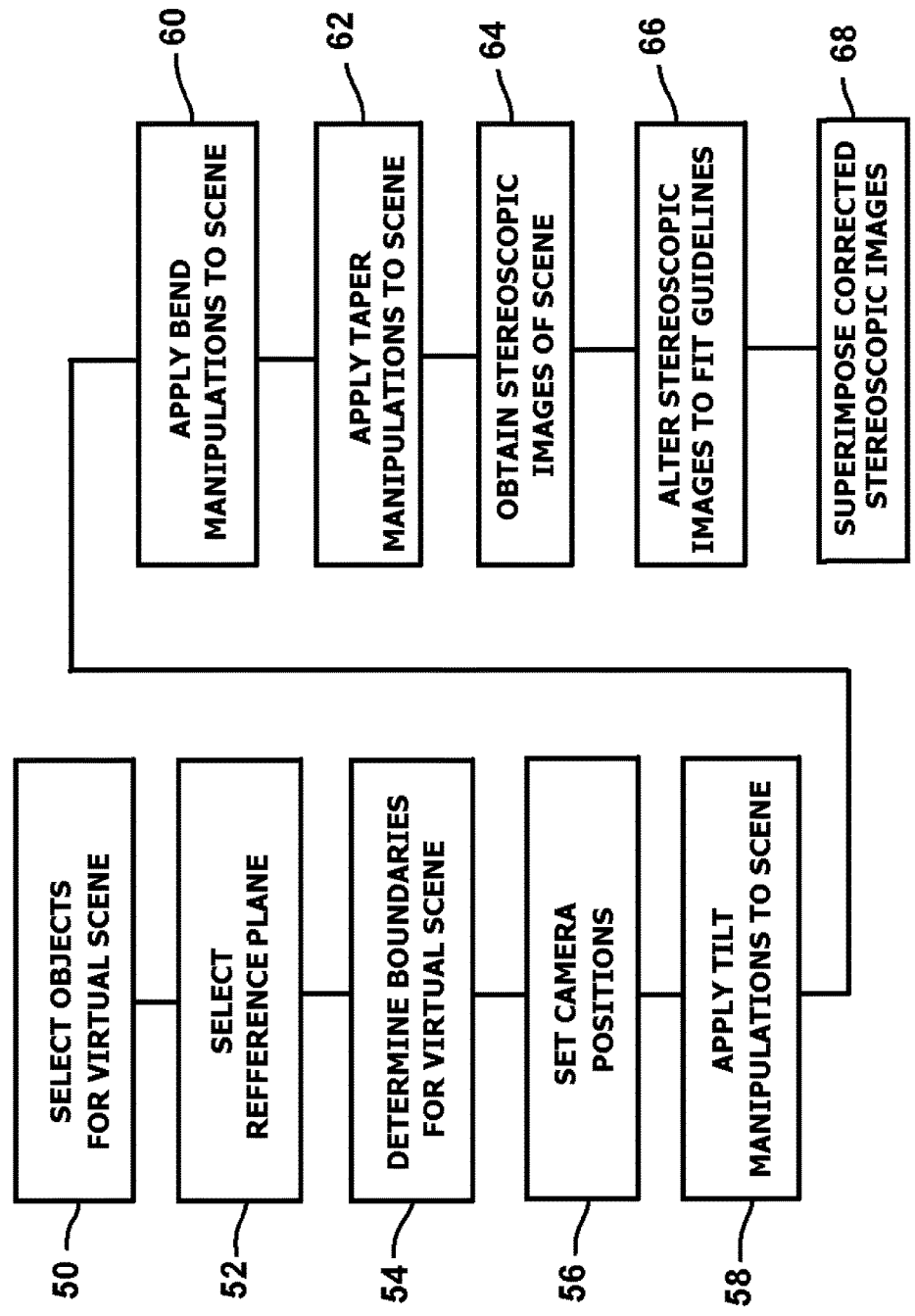
FIG. 12 shows a block diagram logic flow for the software methodology utilized by the present invention.

Referring to FIG. 12 in view of all earlier figures, the software methodology for the overall system can now be summarized. As is indicated in Block 50, a content producer creates a virtual scene 10 that includes one or more objects 20 that are to appear as 3D objects in the virtual scene 10. See prior description of FIG. 1 and FIG. 2. The content producer also selects a reference plane 24 for the virtual scene 10. See Block 52. Using the reference plane 16 and the selected objects 20, the content producer can determine the boundaries of the virtual scene 10. See Block 54.

Knowing the boundaries of the virtual scene 10 and the reference plane 24, the content producer sets the angle and height of virtual camera viewpoints 25, 26 of the real stereoscopic cameras 17. The camera viewpoints are set so that the line of sight for the stereoscopic cameras achieve zero parallax at the reference plane 24. See Block 56. Also see prior description of FIG. 3.

As is indicated by Blocks 58, 60 and 62, the virtual scene 10 is digitally altered using tilt manipulations, bend manipulations and taper manipulations. See prior description of FIG. 4, FIG. 5 and FIG. 6. Two stereoscopic images 40, 42 are then obtained for the virtual scene. See Block 64. Also see prior description of FIG. 7 and FIG. 8. The stereoscopic images 40, 42 are then corrected to fit the boarder guidelines of the virtual image 10. See Block 66. Also see prior description of FIG. 9 and FIG. 10. Lastly, the corrected stereoscopic images are superimposed. See Block 68. Also see prior description of FIG. 11. The result is a final image 48 that will appear to extend above, or in front of, the display 12 when viewed by a user.

It will be understood that the embodiment of the present invention that is illustrated and described is merely exemplary and that a person skilled in the art can make many variations to that embodiment. All such embodiments are intended to be included within the scope of the present invention as defined by the appended claims.

What is claimed is:

1. A method of producing a virtual scene to be viewed on a display, wherein said virtual scene contains a virtual object having a perceived height that appears to be three dimensional when viewed on said display, said method comprising the steps of:
    defining a virtual reference plane having peripheral boundaries that include a front boundary, a rear boundary, and side boundaries;
    setting said virtual object on said virtual reference plane;
    determining stereoscopic camera viewpoints that enable said virtual object to be imaged with said reference plane within said peripheral boundaries of said reference plane;
    altering said virtual object by selecting a first bend point at a first elevation on said virtual object and bending said virtual object only above said first bend point to create an altered virtual object, wherein said first elevation of said first bend point is between 1/3 and 2/3 of said perceived height;
    imaging said altered virtual object from said stereoscopic camera viewpoints, wherein imaging said altered virtual object from said stereoscopic camera viewpoints creates a first image and a second image;
    superimposing said first image and said second image to create a superimposed image;
    defining a common set of boundaries for said superimposed image to create a final image; and
    displaying said final image on said display, wherein said final image appears, at least in part, to extend out of said display.

2. The method according to claim 1, wherein said display has a screen plane and said final image is displayed with said reference plane oriented relative said screen plane.

3. The method according to claim 1, wherein said stereoscopic camera viewpoints are in a common plane and altering said virtual object by virtually bending said portion of said virtual object as viewed from said common plane.

4. The method according to claim 1, wherein altering said virtual object further includes selecting a second bend point at a second elevation on said virtual object, wherein said virtual object is bent by a first angle above said first bend point and by a second angle above said second bend point.

5. The method according to claim 4, wherein said second angle is greater than said first angle.

6. The method according to claim 1, including further altering said virtual object by virtually tapering at least part of said virtual object away from said stereoscopic camera viewpoints.

7. The method according to claim 1, further including altering said virtual object by virtually tilting at least part of said reference plane as viewed from said stereoscopic camera viewpoints.

8. The method according to claim 1, further including altering said virtual object by virtually tilting at least part of said virtual object as viewed from said stereoscopic camera viewpoints.

9. A method of producing a virtual scene to be viewed on a display, wherein said virtual scene contains a virtual object that appears, at least in part, to be three dimensional and to extend out of the display when viewed on said display, said method comprising the steps of:
    defining a virtual reference plane having peripheral boundaries that include a front boundary, a rear boundary, and side boundaries;
    setting said virtual object on said virtual reference plane;
    selecting stereoscopic camera viewpoints that have a viewpoint conversion point on said reference plane under said primary object, wherein said stereoscopic camera viewpoints enable said virtual object to be imaged with said reference plane within said peripheral boundaries of said reference plane;
    altering said virtual object by virtually tilting at least a portion of said reference plane about said viewpoint conversion point to create an altered virtual object;
    imaging said altered virtual object from said stereoscopic camera viewpoints, wherein imaging said altered virtual object from said stereoscopic camera viewpoints creates a first image and a second image;
    superimposing said first image and said second image to create a superimposed image; and
    defining a common set of boundaries for said superimposed image to create a final image.

10. The method according to claim 9, wherein said display has a screen plane and said final image is displayed with said reference plane oriented relative said screen plane.

11. The method according to claim 9, wherein said stereoscopic camera viewpoints are in a common plane and altering said virtual object by virtually tilting at least a portion of said reference plane includes tilting said reference plane proximate said rear boundary as viewed from said stereoscopic camera viewpoints.

12. The method according to claim 9, wherein said stereoscopic camera viewpoints are in a common plane and altering said virtual object by virtually tilting at least a portion of said reference plane includes tilting said virtual object in reference to said stereoscopic camera viewpoints.

13. The method according to claim 9 further including altering said virtual object by virtually bending a portion of said virtual object with reference to said common plane.

14. The method according to claim 9, further including altering said virtual object by virtually tapering at least part of said virtual object away from said stereoscopic camera viewpoints.

15. A method of producing a virtual scene to be viewed on a display, wherein said virtual scene contains a virtual object that appears, at least in part, to be three dimensional and to extend out of said display when viewed on said display, said method comprising the steps of:
    defining a virtual reference plane having peripheral boundaries;
    setting said virtual object on said virtual reference plane, wherein said virtual object has a perceived height;
    determining stereoscopic camera viewpoints that enable said virtual object to be imaged with said reference plane within said peripheral boundaries of said reference plane;
    altering said virtual object by selecting a first point at a first elevation on said virtual object and virtually tapering said virtual object above said first point as viewed from said stereoscopic camera viewpoints to create an altered virtual object, wherein said first elevation of said first point is between $1/3$ and $2/3$ of said perceived height;
    imaging said altered virtual object from said stereoscopic viewpoints, wherein imaging said altered virtual object from said stereoscopic viewpoints creates a first image and a second image;
    superimposing said first image and said second image to create a superimposed image to create a final image.

16. The method according to claim 15, further including showing said final image in a display, wherein said display has a screen plane and said final image is displayed with said reference plane oriented relative said screen plane.

17. A method of producing a virtual scene to be viewed on a display, wherein said virtual scene contains a virtual object that appears, at least in part, to be three dimensional when viewed on said display, said method comprising the steps of:
    defining a virtual reference plane having peripheral boundaries that include a front boundary, a rear boundary, and side boundaries;
    setting said virtual object on said virtual reference plane;
    selecting stereoscopic camera viewpoints that have a viewpoint conversion point on said reference plane under said primary object, wherein said stereoscopic camera viewpoints enable said virtual object to be imaged with said reference plane within said peripheral boundaries of said reference plane;
    altering said virtual object by virtually tilting at least a portion of said virtual object relative said reference plane about said viewpoint conversion point to create an altered virtual object;
    imaging said altered virtual object from said stereoscopic camera viewpoints, wherein imaging said altered virtual object from said stereoscopic camera viewpoints creates a first image and a second image;
    superimposing said first image and said second image to create a superimposed image; and
    defining a common set of boundaries for said superimposed image to create a final image.

* * * * *